United States Patent [19]
Royce

[11] 3,882,041
[45] May 6, 1975

[54] EUROPIUM-ACTIVATED ALKALINE-EARTH PYROPHOSPHATE PHOSPHORS

[75] Inventor: Martin Robert Royce, Lancaster, Pa.

[73] Assignee: RCA Corporation, New York, N.Y.

[22] Filed: Sept. 26, 1973

[21] Appl. No.: 401,030

[52] U.S. Cl. ........................................ 252/301.4 P
[51] Int. Cl. ............................................. C09k 1/36
[58] Field of Search ................ 252/301.4 P, 301.6 P

[56] References Cited
UNITED STATES PATENTS

| | | |
|---|---|---|
| 3,211,666 | 10/1965 | McAllister .................... 252/301.4 P |
| 3,484,383 | 12/1969 | Hoffman ....................... 252/301.4 P |
| 3,488,292 | 1/1970 | McAllister .................... 252/301.4 P |

*Primary Examiner*—Jack Cooper
*Attorney, Agent, or Firm*—G. H. Bruestle; L. Greenspan

[57] ABSTRACT

A phosphor consisting essentially of a pyrophosphate of at least one alkaline-earth element activated with divalent europium and containing, for each mole of phosphor, between 0.00001 and 0.00020 mole, of praseodymium. The phosphor may be used in a cathode-ray tube having a luminescent screen including this phosphor.

6 Claims, No Drawings

EUROPIUM-ACTIVATED ALKALINE-EARTH PYROPHOSPHATE PHOSPHORS

BACKGROUND AND SUMMARY OF THE INVENTION

U.S. pat. Nos. 3,484,383 to M. V. Hoffman and U.S. Pat. No. 3,488,292 to W. A. McAllister both disclose europium-activated alkaline-earth pyrophosphate phosphors. These phosphors are disclosed to be photoluminescent, emitting light in the 3,900 to 4,100 A. region of the spectrum when excited with ultraviolet light. Also, these phosphors are cathodoluminescent.

It has now been found that the cathodoluminescent emission from europium-activated alkaline-earth pyrophosphate phosphors can be intensified; that is, made brighter by incorporating therein 10 to 200 parts terbium and/or praseodymium per million parts of phosphor. This is quite surprising, especially since the novel phosphors exhibit degraded photoluminescence as compared with similar phosphors that are free of terbium and/or praseodymium.

The novel phosphors comprise a host material consisting essentially of a pyrophosphate of at least one alkaline-earth element. The host material is activated with divalent europium, and each mole of the host material contains 10 to 200, preferably 25 to 125, parts per million of at least one of terbium and praseodymium. The novel phosphors may have the empirical formula:

$$M^{+2}_2P_2O_7 : a t Eu^{+2} : b R$$

wherein:

M is at least one of calcium, strontium, barium, and magnesium,

R is at least one of terbium and praseodymium, $a$ equals 0.001 to 0.100 mole, and $b$ equals 0.00001 to 0.00020 mole.

The novel phosphors may be prepared by any of the processes described in the above-cited patents to Hoffman and McAllister, except that a prescribed proportion of terbium and/or praseodymium is included in the raw batch. Generally, the novel phosphors are prepared by heating at temperatures of 950° to 1,350°C a raw batch containing phosphate and the desired cations in the required proportions. The heating step produces the desired pyrophosphate host material and develops the divalent state in the europium.

The invention includes a novel cathode-ray tube comprising a luminescent screen including one or more of the novel phosphors and means for exciting the screen to luminescence. The novel tube may be particularly adapted for use as a flying-spot scanner or for recording on hard copy (silver halide, diazo, electrostatic or like photographic processes) from the viewing screen.

DESCRIPTION OF THE PREFERRED EMBODIMENTS

EXAMPLE 1

Blend the following raw batch together in dry form:

| | | |
|---|---|---|
| 0.80 | mole $SrHPO_4$ | 183.6 grams |
| 1.20 | mole $MgNH_4PO_4 \cdot H_2O$ | 171.0 grams |
| 0.01 | mole $Eu_2O_3$ | 3.5 grams |
| 0.0001 | mole $Tb_2O_3$ | 0.3 grams |

The blended raw batch is placed in a silica crucible and heated for about 3 hours at about 900°C. The batch is cooled, ground to pass 100 mesh and then refired at about 1,075°C for at least 4 hours in a covered alumina crucible. The fired batch is cooled to room temperature and ground to pass through 100 mesh. The product, Sample 4 of the TABLE below, has a white body color, and is both photoluminescent and cathodoluminescent emitting light in the 3,900 to 4,100A. region of the spectrum for both excitations. The product has the empirical formula $Sr_{0.80}Mg_{1.20}P_2O_7 : 0.01Eu^{+2} : 0.0001Tb$.

EXAMPLE 2

Follow the procedure of Example 1 except substitute 0.0001 mole (0.3 grams) of $Pr_2O_3$ for $Tb_2O_3$. The product, Sample 6 of the TABLE, has a white body color and is both photoluminescent and cathodoluminescent, emitting light in the 3,900 to 4,100A. region of the spectrum for both excitations. The product has the approximate empirical formula $Sr_{0.80}Mg_{1.20}P_2O_7 : 0.01Eu^{+2} : 0.0001Pr$.

The TABLE gives data derived from three series of tests run on the phosphor system for a particular phosphor. The first and second series give the data of relative brightness of cathodoluminescence for the six samples of each series. In the third series of tests, six samples were excited with 2,537A. UV light to produce photoluminescence in the six samples. It is readily seen from the data in the TABLE that inclusion of the trace amounts of terbium or praseodymium significantly improves the efficiency of the cathodoluminescence of the phosphor. However, the inclusion of the same trace amounts of terbium or praseodymium significantly degrades the efficiency of the photoluminescence of the phosphors. No changes in the spectral distribution curves were noticed for the various samples, so that the emission is believed to be unchanged and to be that of $Eu^{+2}$.

TABLE

Relative UV Emission from $Sr_{0.8}Mg_{1.2} : _{.01}Eu$ Phosphors

| Sample | Parts Intensifier | First Test Series with Cathode-Ray Excitation | Second Test Series with Cathode-Ray Excitation | Third Test Series with 2537A UV Excitation |
|---|---|---|---|---|
| 1 | none | 100 | 100 | 85 |
| 2 | 25 ppm Tb | 200 | 227 | 42 |
| 3 | 50 ppm Tb | 171 | 228 | 35 |
| 4 | 100 ppm Tb | 156 | 217 | 19 |
| 5 | 50 ppm Pr | 209 | 231 | 8 |
| 6 | 100 ppm Pr | 197 | 220 | 4 |

I claim:

1. A phosphor whose empirical formula is $$M^{+2}_2P_2O_7 : a Eu^{+2} : b R$$

wherein:

M is at least one of calcium, strontium, barium, and magnesium, $a$ equals 0.001 to 0.100 mole, and $b$ equals 0.00001 to 0.00020 mole.

2. The phosphor defined in claim 1 wherein M is strontium.

3. The phosphor defined in claim 1 wherein M is calcium.

4. The phosphor defined in claim 1 wherein M is barium.

5. The phosphor defined in claim 1 wherein M is magnesium.

6. The phosphor defined in claim 1 wherein M is strontium and magnesium.

* * * * *